Nov. 27, 1934.   W. G. COOK   1,982,338
ACCELERATION CONTROL MEANS
Filed Aug. 25, 1933   2 Sheets-Sheet 1

WITNESSES:

INVENTOR
Willard G. Cook.
BY
ATTORNEY

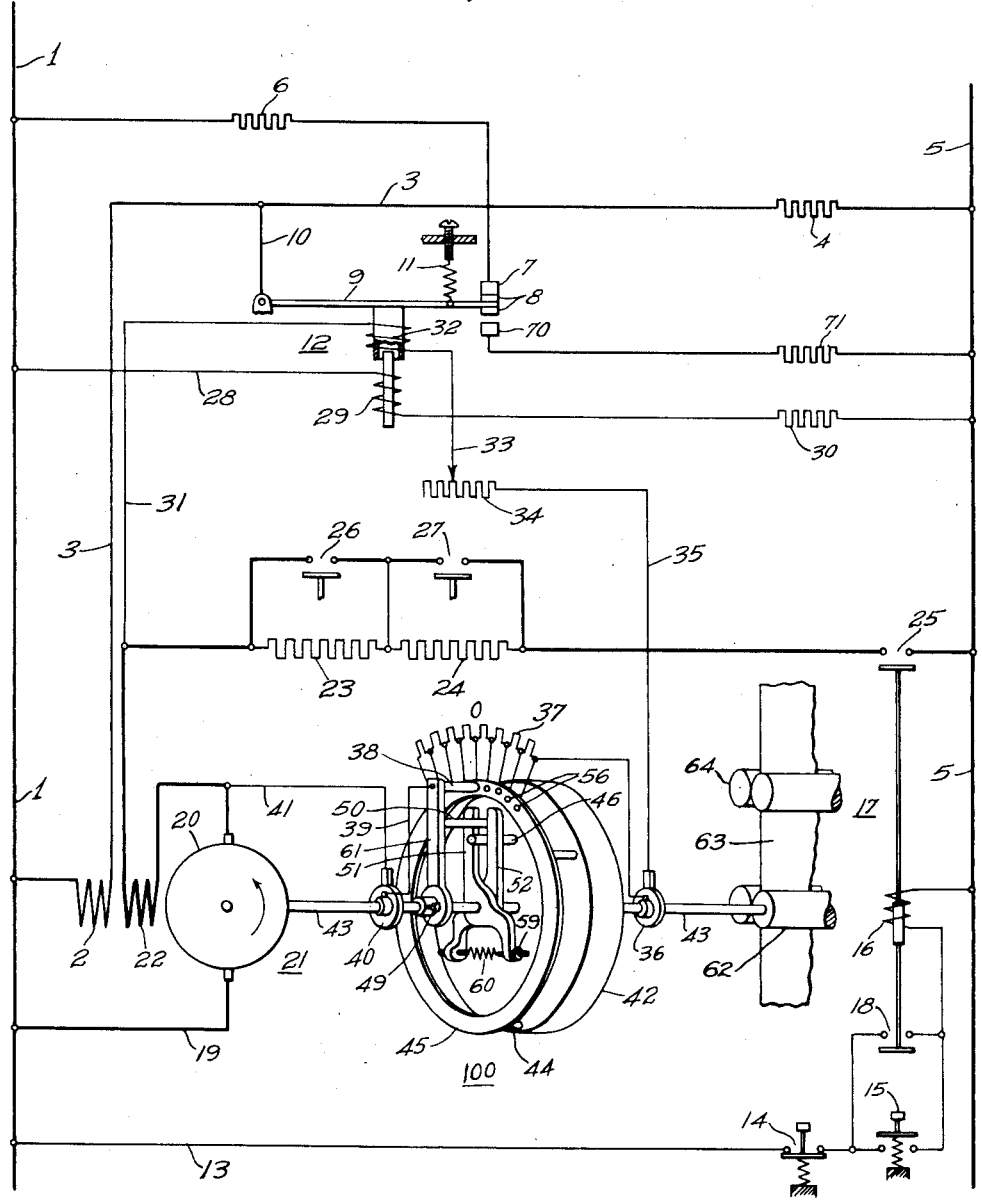

Patented Nov. 27, 1934

1,982,338

UNITED STATES PATENT OFFICE 1,982,338

ACCELERATION CONTROL MEANS

Willard G. Cook, Forest Hills, Pa., assignor to Westinghouse Electric & Manufacturing Company, East Pittsburgh, Pa., a corporation of Pennsylvania Application August 25, 1933, Serial No. 686,770

14 Claims. (Cl. 172—239)

This invention relates to a control system for governing the operating characteristics of a motor and one object of my invention is to satisfactorily control the torque delivered by a motor.

Another object of my invention is to selectively vary the torque delivered by a motor to any predetermined value independently of speed variations of the motor.

A further object of my invention is to maintain the torque delivered by a motor substantially constant independently of speed variations of the motor.

The demand for such a device as is hereinafter disclosed has arisen from the need of maintaining substantially constant tensions on strips of steel or other metal between the mill and the reel in modern cold rolling practice. While it is recognized that the need has arisen in the rolling mill practice, it is obvious that my invention is of general application and not in the least limited to any particular field of application. In the description hereinafter given, my invention will be disclosed in connection with a rolling mill. However, such explanation is merely illustrative, since my invention may be equally useful in the printing industry, paper mill industry, the textile industry, where it is frequently necessary to maintain a fixed tension on a material being dyed regardless of the requisite speed changes, and other industries to which no reference is herein made.

With the devices of the prior art, an attempt was made to control the useful torque delivered by a motor by taking the current input to the motor as an indication of the useful torque delivered and in a corresponding manner controlling either the armature current of the motor or the field current of the motor or both. When a selected substantially constant tension is required in a strip of material being rolled at a low speed, the motor needed is one having an appreciable amount of inertia. The foregoing method is thus quite inaccurate for practical purposes and always inaccurate theoretically. This is so because the torque delivered by the motor during acceleration as well as deceleration of the motor and load operated thereby, is not at all proportional to the current input, that is, the armature current of the motor. The torque developed by the motor is in part consumed in accelerating the masses during the acceleration of the load and the motor, and is in part not needed during the deceleration of the load and motor. In short, the useful torque delivered by a motor during acceleration is equal to the torque developed minus the torque consumed in accelerating the masses, whereas the useful torque delivered by the motor during deceleration is equal to the torque developed plus the torque imparted to the driving shaft by the decelerating rotating masses.

It is thus a further object of my invention to eliminate the defects inherent in the prior art in connection with control systems for controlling the useful torque delivered by a motor.

Other objects and advantages will become more apparent from a study of the following specification, particularly when considered in conjunction with the accompanying drawings, wherein:

Fig. 3 is a diagrammatic showing of a system of control for a motor utilizing my acceleration-responsive device for controlling the useful torque delivered by the motor being controlled.

Figure 1:
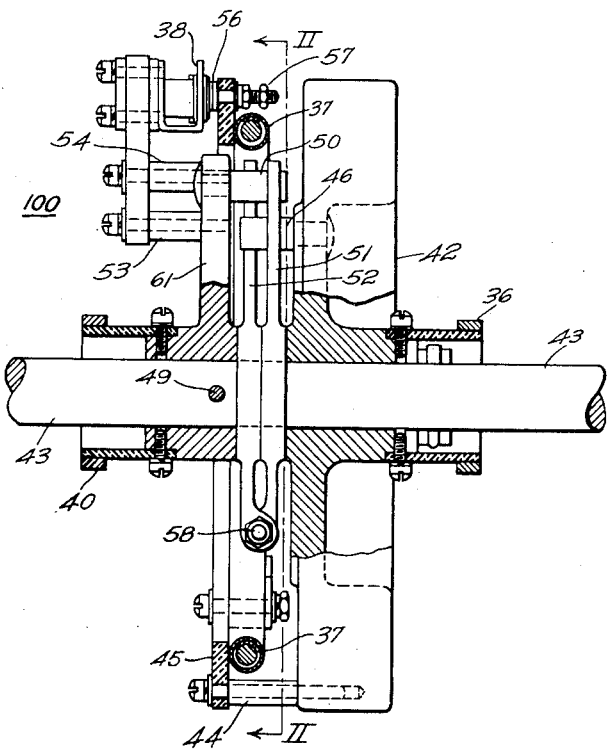
Figure 1 is a side view, with parts broken away, of my device when responsive to the change of speed of a driving shaft.

My invention includes a motor 21, which is to be controlled, driven machines 62 and 64 operating on material 63. A device 100, responsive to speed changes of the motor, is mounted on the motor armature shaft and through the cooperative action of a regulating device 12 controls the motor speed. The motor is also provided with a starting switch 15, armature contactor 17, and a stopping switch 14 as well as suitable means for controlling the acceleration of the motor.

The regulating device 12 has a main coil 29 energized through conductor 28 and resistor 30 from the energized conductors 1 and 5. The main coil 29 is thus energized a fixed amount dependent upon the usually constant voltage of the source of supply. The regulating device, however, has a coil 32 mounted on a movable hollow armature, which may envelop the upper end of the core for coil 29. This coil 32 in practice is thus usually mounted in a region of uniform flux produced by the main coil 29 so that very small variations of current in coil 32 cause shifting of the armature 9.

Referring more particularly to Fig. 1 of the drawings, the drive shaft 43 of a motor (not shown) has a comparatively small flywheel 42 loosely mounted thereon. The flywheel 42 has a pin 46 for engaging a centering device having arms 51 and 52 loosely mounted on shaft 43, but disposed by means of spring 60, (see Fig. 2) to resiliently engage the pin 46. The spring 60 is provided with adjusting means 58 and 59 whereby the tension may be varied as desired.

An arm or operator 61 is keyed to the shaft 43 either by a key disposed longitudinally of the shaft or by a set screw as shown at 49. This arm 61 has a pin 50 which is also disposed intermediate the arms 51 and 52. It will thus be obvious that during rotation of shaft 43 at a constant speed, pins 50 and 46, being disposed intermediate the arms 51 and 52, will carry the flywheel along with the shaft 43. However, during acceleration or deceleration of the shaft 43, the speed of the flywheel 42 will tend to be different than the speed of the shaft 43, in accordance with well-known principles.

Figure 2:
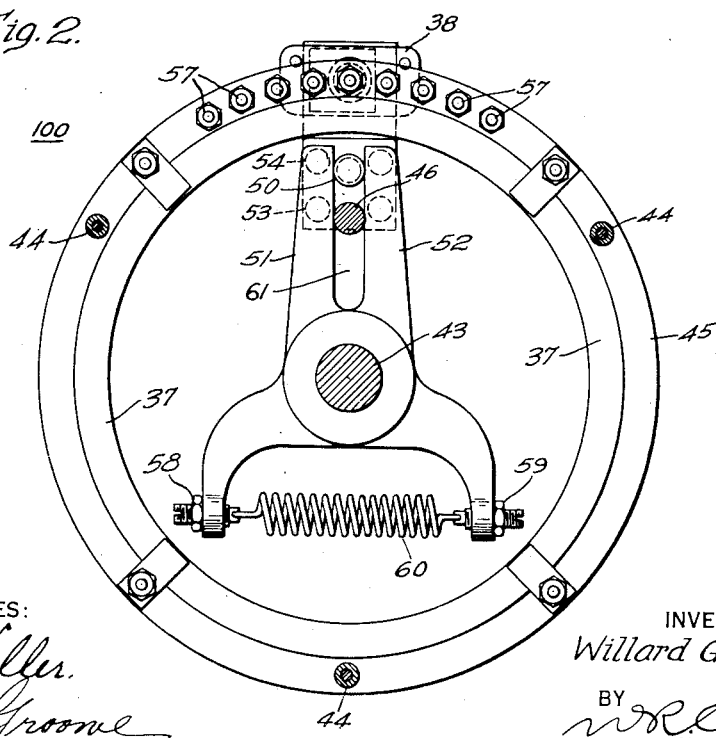
Fig. 2 is a sectional view taken on line II—II of Fig. 1 showing the centering device for the acceleration-responsive means.

During acceleration, for instance, pin 50 will carry arm 52 in a clockwise direction, assuming a clockwise rotation of shaft 43 in Fig. 2. However, pin 46, being secured to the loosely mounted flywheel 46, will lag behind, whereby the arm 61 is shifted in a clockwise direction with reference to the fly wheel 42.

The flywheel 42 has a plurality of studs 44 carrying an annulus 45 of insulating material for securely holding a resistor 37 (Fig. 3). The flywheel 42 also has a slip ring 36, and the arm 61 a slip ring 40. By means of suitable circuit connections comprising conductors and contacts, the slip rings 36 and 40 are interconnected with the resistor 37. A better understanding of this circuit arrangement can be had by an inspection of Fig. 3. The arm 61 carries a pair of studs 53 and 54 for carrying a sliding contact 38, engaging the contacts 56. Contacts 56, by means of binding posts 57 and suitable conductors, are connected at selected points to the resistor 37.

It should also be apparent from the foregoing description and an inspection of Figs. 1 and 2 that flywheel 42, during deceleration, leads the rotation of the shaft 43, thereby shifting pin 50 counter-clockwise with respect to the flywheel 42, that is, sliding contact 38 is shifted counter-clockwise and thus causes the insertion of fewer resistor sections 37 in the circuit between the slip rings 36 and 40.

Probably a complete understanding of my invention may be had by a study of the sequence of operation of the devices shown in the circuit diagram illustrated in Fig. 3. If conductors or buses 1 and 5 are assumed to be energized, an energized circuit is established from conductor 1 through shunt field winding 2 of the motor 21, conductor 3, and field rheostat 4 to the conductor 5. A second circuit is established from conductor 1 through resistor 6, stationary contact member 7, movable contact member 8, vibrating armature 9 of the regulating relay 12, and conductor 10 to the energized conductor 3. This last traced circuit is obviously in parallel circuit relation to the shunt field winding 2, and by the operations of the regulating device 12 hereinafter explained more in detail, the excitation of the field winding 2 may be definitely controlled. It should be noted that spring 11 of the regulating device biases the contact member 8 to engage contact member 7.

To start the operation of the system, starting switch 15 is actuated thereby establishing a circuit from the conductor 1 through conductor 13, stop switch 14, starting switch 15, and actuating coil 16 of the line contactor 17 to the energized conductor 5. Operation of the line contactor 17 closes the contact members 18, thereby establishing a holding circuit for coil 16. The starting switch 15 may thereafter be released and the acceleration of the motor will proceed automatically without any further acts on the part of the attendant.

Operation of the line contactor 17 also establishes an energizing circuit for the armature of the motor, which circuit may be traced from conductor 1 through conductor 19, armature 20 of the motor 21, series field winding 22, resistor sections 23 and 24 of the accelerating resistor and contact members 25 of the line contactor 17 to the energized conductor 5. Since the system of control for accelerating the motor, that is, varying the voltage impressed on the armature of the motor, is no part of this invention, the accelerating contactors 26 and 27, for respectively short-circuiting resistor sections 23 and 24, have been shown only diagrammatically. It is, of course, obvious that the motor 21 may have many other elements of an electrical control system for properly accelerating and decelerating the motor.

Coil 32 is connected in parallel circuit relation to the series field winding 22. This circuit may be traced from the left-hand terminal of field 22 through conductor 31, coil 32, contact arm 33 having sliding engagement with the resistor 34, conductor 35, slip ring 36, resistor 37, contact members 56 and 38, conductor 39, slip ring 40, and conductor 41 to the right-hand terminal of field 22. It is not important so far as my invention is concerned that coil 32 be connected in parallel to the series field winding 22. It is sufficient that coil 32 be so connected that the current therein be a function of the armature current of the motor 21.

The motor 21 is connected to the load by the shaft 43, which load is herein shown as a pair of rolls 62 operating on a strip of material 63 coming from another pair of rolls 64. The important feature, as hereinbefore pointed out, is to maintain the useful torque delivered by the motor constant, thereby maintaining the tension in material 63 at a constant selected value. By properly adjusting the tension of spring 60 as well as the position of contact arm 33 on resistor 34, any given tension may be imparted to material 63, but by the novel features of my invention, such tension would remain at any given value regardless of the variations in speed of the motor 21.

If, as hereinbefore pointed out, the motor has been energized and begins to accelerate, flywheel 42 will lag behind and arm 61 will move in a counter-clockwise direction with reference to the flywheel 42 (see Fig. 3). The result will be that more and more sections of the resistor 37 are connected in circuit with the coil 32, thus permitting the armature 9 to move upwardly by the action of spring 11 to cause contact member 8 to engage the contact member 7, as shown in Fig. 3. Since the regulating device 12 is very sensitive, contact members 7 and 8 do not, in fact, remain in engagement very long but are, even during normal operation, interrupted repeatedly. That is, armature 9 vibrates at a comparatively high rate of speed so that the current through resistor 6 is a uni-directional pulsating current with the result that the excitation of field 2 is a direct function of the rate of vibration of armature 9. As hereinbefore pointed out, a decrease of current in coil 32 causes the contact members 7 and 8 to remain in engagement for longer intervals of time than just prior to such decrease of current in coil 32, and in consequence, the field excitation of field winding 2 is decreased because the resistor 6 remains in shunt circuit relation for a longer interval of time.

A decrease of the excitation of the field winding 2 will have a tendency to increase the speed of the motor 21, but since such change in speed must necessarily lag very far behind the change in excitation caused by the regulating device 12, the torque of the motor is very materially increased; yet such increase of torque over and above the torque necessary to maintain a given tension in material 63 is directly proportional to the rate of acceleration of the rotating masses driven by the motor. In other words, the torque delivered by the motor is equal to the torque developed minus the torque required to accelerate the load and rotating parts driven by the motor.

During a period of deceleration, the operation is substantially the reverse, namely, arm 61 will now move in a clockwise direction (see Fig. 3) with reference to flywheel 42, which now leads the rotation of the shaft 43, with the result that fewer sections of the resistor 37 are connected in circuit relation with coil 32. The current in coil 32 increases very materially until contact member 8 vibrates against lower contact member 70, thereby not only removing the shunt resistor 6 from the circuit of field 2 but also connecting the resistors 4 and 71, connected in parallel, in series circuit relation with the field winding 2. The field excitation is thus very materially increased, thus tending to decrease the speed of the motor. However, since the change in speed must necessarily lag very far behind the increase in excitation of the field winding 2, the torque of the motor 21 is very materially decreased. That is, the torque delivered is now equal to the torque developed plus the torque imparted to the shaft 43 by the rotating masses. In fact, the torque developed may be negative, i. e., the motor may be operating as a generator.

The operation of the regulating device 12 is much the same for deceleration as it is for acceleration of the masses, the only difference being that contact member 8 vibrates against contact member 70, and the length of time that contact member 8 is in firm engagement with contact member 70 is again a definite function of the rate of deceleration of the motor.

I am, of course, aware that those skilled in the art, after having had the benefit of the teachings of my invention, may develop modifications and other circuit arrangements for accomplishing the novel results hereinbefore explained and claimed in the appended claims, but it is to be understood that the foregoing explanation is merely illustrative and that my invention is only to be limited by the scope of the appended claims and the pertinent prior art.

I claim as my invention:

1. In a system of control for a motor, in combination, a motor, a source of energy, means for connecting the motor to said source of energy, a load driven by said motor, and control means responsive to changes of speed of said motor for maintaining the torque delivered by said motor substantially constant.

2. In a system of control for a motor, in combination, a source of energy, means for connecting the motor to said source of energy, a load driven by said motor, control means responsive to acceleration of said motor, and means responsive to said control means for increasing the normal torque of said motor by an amount proportional to said acceleration whereby the torque delivered is maintained substantially constant.

3. A system of control for a motor, in combination, a motor having a field winding, means for varying the excitation of said field winding to vary the torque developed by said motor, a machine for operating on material driven by said motor, and means responsive to changes in speed of the motor for controlling said first named means to thus cause a torque variation proportional to the change in speed of the motor and thereby maintain substantially constant application of torque to said material.

4. The combination of a motor having an armature winding and a field winding, a source of power connected to energize said motor, and control means for maintaining the torque delivered by said motor substantially constant, said control means including a field excitation control device having means responsive to the rate of change of speed of the motor and the armature current.

5. The combination of a motor having an armature winding and a field winding, a source of power connected to energize said motor, control means for maintaining the torque delivered by said motor substantially constant, said control means including a field excitation control device having means responsive to the rate of change of speed of the motor and the armature current, and means for selecting the value of the control effect of said field excitation control device.

6. A system of control for electrical machines, in combination, a motor, a shaft driven thereby, an inertia member loosely mounted on the shaft, an operator fixed to the shaft, a resilient connection between the inertia member and the operator, a resistor mechanically coupled to the inertia member and electric-circuit means including said resistor and control means for controlling the torque developed by said motor, and a contact member actuated by the operator for varying the resistance value of the electric-circuit means proportionally to the displacement of the inertia member relative to the operator by varying the number of resistor sections of said resistor that are connected in the said electric-circuit means.

7. In a control system for maintaining the delivered torque of a motor substantially constant, an inertia member, an operator disposed to rotate at a speed proportional to the speed of the motor, a resilient connection between the operator and the inertia member whereby said inertia member is caused to rotate with the operator but is permitted to lag behind the movements of the operator during acceleration of the motor and permitted to lead the movements of the operator during deceleration, and means responsive to the relative displacement of the operator and inertia member for maintaining the torque delivered by said motor substantially constant regardless of changes in speed of the motor.

8. In a system of control for a motor, in combination, a motor having an armature and a field winding, and means responsive to the armature current of the motor and the rate of change of speed of the motor for varying the field excitation of the motor to maintain the torque delivered by the motor substantially constant regardless of variations in speed of the motor.

9. In a system of control for a motor, in combination, a motor having a field winding, a machine driven by the motor, and means responsive to the acceleration of the motor to control the field excitation to increase the torque developed by the motor by an amount proportional to the torque required to accelerate the rotating elements of the motor and the machine driven thereby.

10. In a system of control for a motor, in combination, a motor having a field winding, a machine driven by the motor, and means responsive to the deceleration of the motor to control the field excitation to decrease the torque developed by the motor by an amount proportional to the torque required to decelerate the rotating elements of the motor and the machine driven thereby.

11. In a system of control for a motor, in combination, a motor having a field winding, a machine driven by the motor, and means for varying the torque developed by the motor to compensate for the torque required to change the speed of the motor and machine driven thereby.

12. In a system of control of the class described, a motor, a machine coupled to the motor, an inertia member, an operator actuated to move proportionally to the movements of the motor, a resilient connection between the operator and inertia member whereby the inertia member is caused to move with the operator but may be displaced relative to the operator by an amount proportional to the rate of change of speed of the motor, and means responsive to the relative displacement of the operator and inertia member for maintaining the useful torque delivered by the motor substantially constant.

13. In a system of control for a motor, in combination, a source of energy, means for connecting the motor to said source of energy, a load driven by said motor, control means responsive to the rate of change of the speed of the motor, and means responsive to said control means for changing the normal torque of said motor by an amount proportional to said rate of change of speed whereby the torque delivered by said motor is maintained substantially constant.

14. In a system of control for a motor, in combination, a source of energy, means adapted to connect said motor to said source of energy, a load driven by said motor, control means responsive to the deceleration of said motor, and means responsive to said control means for decreasing the normal torque of said motor by an amount proportional to said deceleration whereby the torque delivered is maintained substantially constant.

WILLARD G. COOK.